(12) United States Patent
Sugiura et al.

(10) Patent No.: US 10,650,813 B2
(45) Date of Patent: *May 12, 2020

(54) ANALYSIS OF CONTENT WRITTEN ON A BOARD

(71) Applicant: International Business Machines Corporation, Armonk, NY (US)

(72) Inventors: Tomonori Sugiura, Yokohama (JP); Tomoka Mochizuki, Tokyo (JP); Lianzi Wen, Kanagawa-Ken (JP); Munehiko Sato, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/605,166

(22) Filed: May 25, 2017

(65) Prior Publication Data

US 2018/0342245 A1    Nov. 29, 2018

(51) Int. Cl.
*G10L 15/22* (2006.01)
*G06K 9/46* (2006.01)
(Continued)

(52) U.S. Cl.
CPC .......... *G10L 15/22* (2013.01); *G06F 17/2785* (2013.01); *G06K 9/00624* (2013.01);
(Continued)

(58) Field of Classification Search
None
See application file for complete search history.

(56) References Cited

U.S. PATENT DOCUMENTS

| | | | |
|---|---|---|---|
| 6,192,342 B1 * | 2/2001 | Akst | H04N 7/142 348/E7.079 |
| 6,512,538 B1 * | 1/2003 | Hollier | G10L 25/69 348/192 |

(Continued)

FOREIGN PATENT DOCUMENTS

| | | |
|---|---|---|
| JP | H09130521 A | 5/1997 |
| JP | 2011066794 A | 3/2011 |
| JP | 2016096530 A | 5/2016 |

OTHER PUBLICATIONS

Sugiura et al., "Anaylsis of Content Written on a Board," U.S. Appl. No. 15/897,212, filed Feb. 15, 2018.

(Continued)

*Primary Examiner* — Thuykhanh Le
(74) *Attorney, Agent, or Firm* — Peter J. Edwards

(57) ABSTRACT

A computer-implemented method for analyzing content written on a board, on which a text and/or a drawing are made, is disclosed. The method includes obtaining content data including a series of images, which captures content being written on the board. The method also includes obtaining utterance data representing a series of utterances, which is associated with the series of the images. The method further includes extracting a section from the series of the utterances based on a change in topics and recognizing a content block for the section from the content data. The content block includes one or more content parts written during the section. The method includes further calculating evaluation value for the content block by using one or more utterances included in the section.

20 Claims, 9 Drawing Sheets

(51) Int. Cl.

| | |
|---|---|
| *G10L 21/16* | (2013.01) |
| *G10L 17/22* | (2013.01) |
| *G10L 21/0272* | (2013.01) |
| *G10L 25/63* | (2013.01) |
| *G10L 15/18* | (2013.01) |
| *G10L 15/26* | (2006.01) |
| *G10L 17/00* | (2013.01) |
| *G06F 17/27* | (2006.01) |
| *G06K 9/00* | (2006.01) |
| *G06K 9/32* | (2006.01) |
| *G06K 9/72* | (2006.01) |

(52) U.S. Cl.
CPC ......... *G06K 9/3258* (2013.01); *G06K 9/4642* (2013.01); *G06K 9/72* (2013.01); *G10L 15/1815* (2013.01); *G10L 15/26* (2013.01); *G10L 17/00* (2013.01); *G10L 17/22* (2013.01); *G10L 21/0272* (2013.01); *G10L 21/16* (2013.01); *G10L 25/63* (2013.01)

(56) References Cited

U.S. PATENT DOCUMENTS

| | | | |
|---|---|---|---|
| 8,060,366 B1 | 11/2011 | Maganti et al. | |
| 8,334,902 B2* | 12/2012 | Golovchinsky | H04N 7/18 348/135 |
| 9,195,697 B2* | 11/2015 | Black | G06F 3/038 |
| 9,338,199 B2 | 5/2016 | Paulik et al. | |
| 2002/0051958 A1* | 5/2002 | Khalsa | G09B 19/22 434/238 |
| 2004/0263636 A1* | 12/2004 | Cutler | H04N 7/15 348/211.12 |
| 2005/0182627 A1* | 8/2005 | Tanaka | G11B 20/00007 704/248 |
| 2007/0071206 A1* | 3/2007 | Gainsboro | H04M 3/2281 379/168 |
| 2007/0192103 A1* | 8/2007 | Sato | G10L 17/26 704/253 |
| 2007/0269105 A1* | 11/2007 | Zhang | G06Q 10/1095 382/165 |
| 2009/0119246 A1* | 5/2009 | Kansal | G06F 16/48 |
| 2010/0245563 A1* | 9/2010 | Golovchinsky | H04N 7/18 348/135 |
| 2011/0032845 A1* | 2/2011 | Agapi | H04L 12/413 370/260 |
| 2011/0270609 A1* | 11/2011 | Jones | H04M 3/56 704/235 |
| 2011/0288866 A1* | 11/2011 | Rasmussen | H04L 12/1831 704/246 |
| 2012/0254142 A1* | 10/2012 | Knowlton | G06Q 50/01 707/705 |
| 2013/0063537 A1* | 3/2013 | Emori | H04N 7/147 348/14.01 |
| 2014/0101079 A1* | 4/2014 | Deal | G06N 5/045 706/12 |
| 2014/0105563 A1* | 4/2014 | Voorhees | G09B 5/02 386/224 |
| 2014/0139609 A1* | 5/2014 | Lu | H04N 7/15 348/14.03 |
| 2014/0149117 A1* | 5/2014 | Bakish | G10L 15/24 704/248 |
| 2014/0163970 A1* | 6/2014 | Zhan | H04M 3/56 704/201 |
| 2014/0278405 A1* | 9/2014 | Peters | G06F 16/345 704/235 |
| 2014/0282089 A1* | 9/2014 | West | H04L 65/403 715/753 |
| 2015/0012844 A1* | 1/2015 | Paulik | H04L 65/403 715/753 |
| 2015/0058017 A1* | 2/2015 | Singh | G06F 21/10 704/249 |
| 2015/0127340 A1* | 5/2015 | Epshteyn | G10L 15/26 704/235 |
| 2016/0351074 A1* | 12/2016 | Paul | A61B 5/7264 |
| 2017/0004858 A1* | 1/2017 | Ngiam | G11B 27/005 |
| 2017/0339082 A1* | 11/2017 | Pinel | H04L 51/063 |
| 2018/0025248 A1* | 1/2018 | Shan | G06K 9/222 382/189 |
| 2018/0284907 A1* | 10/2018 | Kolahdouzan | G06F 3/0484 |
| 2018/0285321 A1* | 10/2018 | Antony | G06F 17/212 |

OTHER PUBLICATIONS

List of IBM Patents or Patent Applications Treated as Related, Dated Feb. 9, 2018, 2 pages.
"Accelerated Examination Support Document," International Business Machines Corporation, Dated Feb. 9, 2018, 20 Pages.
Geyer, et al., "Towards a Smarter Meeting Record—Capture and Access of Meetings Revisited," Springer, vol. 27, Issue 3, Dec. 2005, pp. 393-410, doi:10.1007/s11042-005-3815-0 http://link.springer.com/article/10.1007/s11042-005-3815-0.
He, et al., "Why Take Notes? Use the Whiteboard Capture System," Microsoft Research Technical Report MSR-TR-2002-89, printed May 22, 2017, 10 pages http://research.microsoft.com/en-us/um/people/zhang/Papers/TR-02-89.pdf.
Unknown, "PrismTrace," PrismTrace is a plugin for Adobe Illustrator and able to convert bitmap images into paths via tracing (separating a foreground from a background), printed on May 23, 2017, 1 page.
Yumak, et al., "Modelling Multi-Party Interactions among Virtual Characters, Robots, and Humans," Journal Presence: Teleoperators and Virtual Environments, vol. 23, Issue 2, Spring 2014, pp. 172 to 190.
Author Unknown, Title Unknown, http://www.comnet-network.co.jp/software/case/plugin.html#prism, last visited Nov. 13, 2019.
Author Unknown, Title Unknown, https://www.comnet-network.co.jp/blogicase-illustrator-plugin-prismtrace/, last visited Nov. 13, 2019.

\* cited by examiner

| TIME | UTTERANCE TEXT | SPEAKER | CONTENT |
|---|---|---|---|
| 10:01 | Everyone, let's get started today's meeting. Today we are discussing about presentation. Let's first talk about.... | Charlie | Content_001 |
| 10:05 | In this regard, please see page 8 of this handout..... | Bob | Content_002 |
| 10:07 | Referring to this document, you can find more detailed explanation about... | Alice | |
| 10:10 | OK, Let's talk about next topic.... | Charlie | Content_003 |

ANALYSIS OF CONTENT WRITTEN ON A BOARD

BACKGROUND

The present disclosure, generally, relates to content analysis techniques for retrieving meaningful information from content, more particularly, to techniques for analyzing content written on a board.

In a meeting, text and/or drawings are often made on a surface of a board such as a whiteboard, blackboard, etc. A picture of the content written on the whiteboard can be taken by a camera device and transferred to a personal computer in order to look back at discussions in future, for example.

However, since the content written on the whiteboard is typically captured as one picture or document, and the discussions may be typically performed across multiple topics; it is difficult to identify a particular part about which discussions have been made mainly, and participants who have been involved in the discussions, when a user looks back at the discussions.

SUMMARY

According to an embodiment of the present invention there is provided a computer-implemented method for analyzing content written on a board. The method includes obtaining content data, which includes a series of images capturing content being written on the board. The method also includes obtaining utterance data that represents a series of utterances. The series of the utterances is associated with the series of the images. The method further includes extracting a section from the series of the utterances based on a change in topics. The method further includes recognizing a content block for the section from the content data. The content block includes one or more content parts written during the section. The method includes further calculating an evaluation value for the content block by using one or more utterances included in the section.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for analyzing content written on a board, on which a text and/or a drawing are made, by using data of utterances regarding the content.

A picture of content written on a whiteboard during a meeting can be typically taken by a camera device and transferred to a personal computer in order to look back at discussions in future. However, the picture of the content does not provide knowledge as to what has been discussed mainly and how many participants have been involved in the discussion in relation to the written content.

So, there is a need for a novel technique for analyzing content written on a board to provide a graphical representation, capable of identifying a particular part about which discussions have been made actively.

Hereinafter, referring to a series of FIGS. 1-8, there is described a computer system and a process for analyzing content being written on a whiteboard by using data of utterances regarding the content, according to an exemplary embodiment of the present invention.

Figure 1:
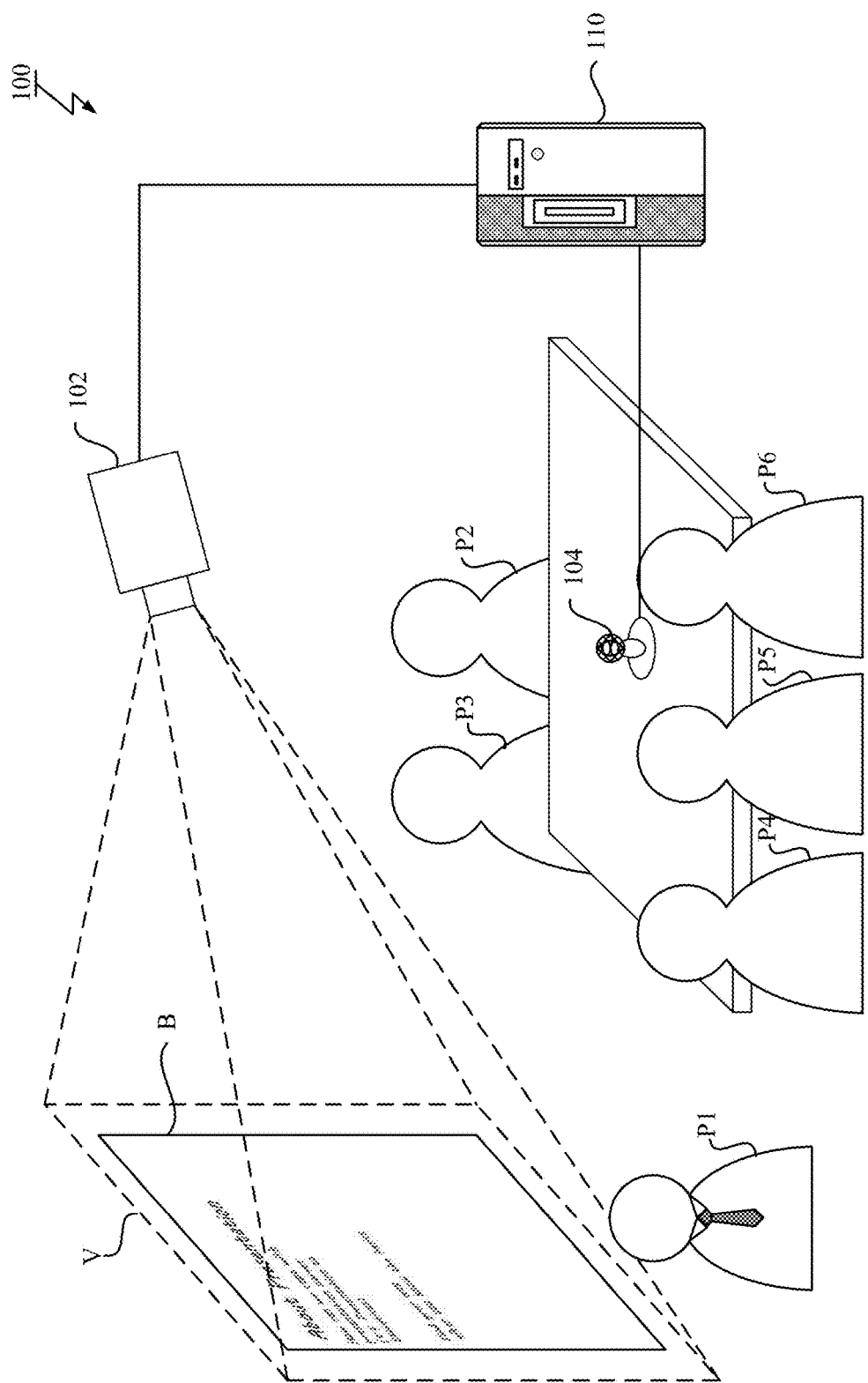
FIG. 1 illustrates a schematic of a content recording and analysis system according to an exemplary embodiment of the present invention.

Referring to FIG. 1, a schematic of a content recording and analysis system according to an exemplary embodiment of the present invention is illustrated.

As shown in FIG. 1, the content recording and analysis system 100 includes a camera device 102 configured to capture an image of a surface of a whiteboard B during communications such as a meeting; a microphone 104 configured to pick up sound from user environment where one or more participants P talks each other during the communications; and a computer system 110 configured to analyze content being written on the surface of the whiteboard B during the communications by using image data transmitted from the camera device 102 and audio data transmitted from the microphone 104.

The camera device 102 may be set up so as to capture the surface of the whiteboard B within its camera view range V. The camera device 102 may connect with the computer system 110 through an appropriate connection, which may include a USB (Universal Serial Bus) connection, a wireless connection, an IP (Internet Protocol) network connection, etc. The camera device 102 is configured to take a series of images of scene in the camera view range V, which may include content being written on the whiteboard B, and to transmit the series of the images to the computer system 110. The camera device 102 may be installed in a place, including a meeting room, a classroom, or other place where a kind of communications using the whiteboard B can be held.

When the camera device 102 is a video camera, the camera device 102 may transmit a stream of video images with a certain frame rate to the computer system 110, continuously. When the camera device 102 is a still camera, the camera device 102 may transmit a series of still images with certain intervals to the computer system 110. In both cases, a series of images may be acquired by the computer system 110, and referred to as the image data.

The microphone 104 may be set up so as to pick up voices spoken by the participants P while the content is being written on the whiteboard B and captured by the camera device 102. The microphone 104 may connect with the computer system 110 through an appropriate connection, which may include a phone connector, a USB connection, a wireless connection, etc. The microphone 104 is configured to continuously output audio data, which may convey utterances of the participants P, to the computer system 110. Each utterance may be a statement, a remark, a question, a declaration, a proposal, or a response, each of which is spoken by one participant P during the communications. The microphone 104 may be installed in the place separately from the camera device 102 as illustrated in FIG. 1 or may be built in the camera device 102.

In a situation described in FIG. 1, the one or more participants (e.g. P1-P6) may have a discussion on one or more topics while one participant (e.g. P1) may write a text and/or drawing on the surface of the whiteboard B as the discussion evolved. During the discussion, video data (that includes the image data and the audio data) is generated by capturing the content being written on the whiteboard B and utterances being spoken by the participants P, and is transmitted to the computer system 110.

In an exemplary embodiment, the whiteboard is employed as a board on which a text and/or drawing are made during communications. However, the whiteboard is merely an example and any kind of boards, including a blackboard, an interactive whiteboard, and a tablet computer on which a whiteboard application is installed, can be used as the board.

Figure 2:
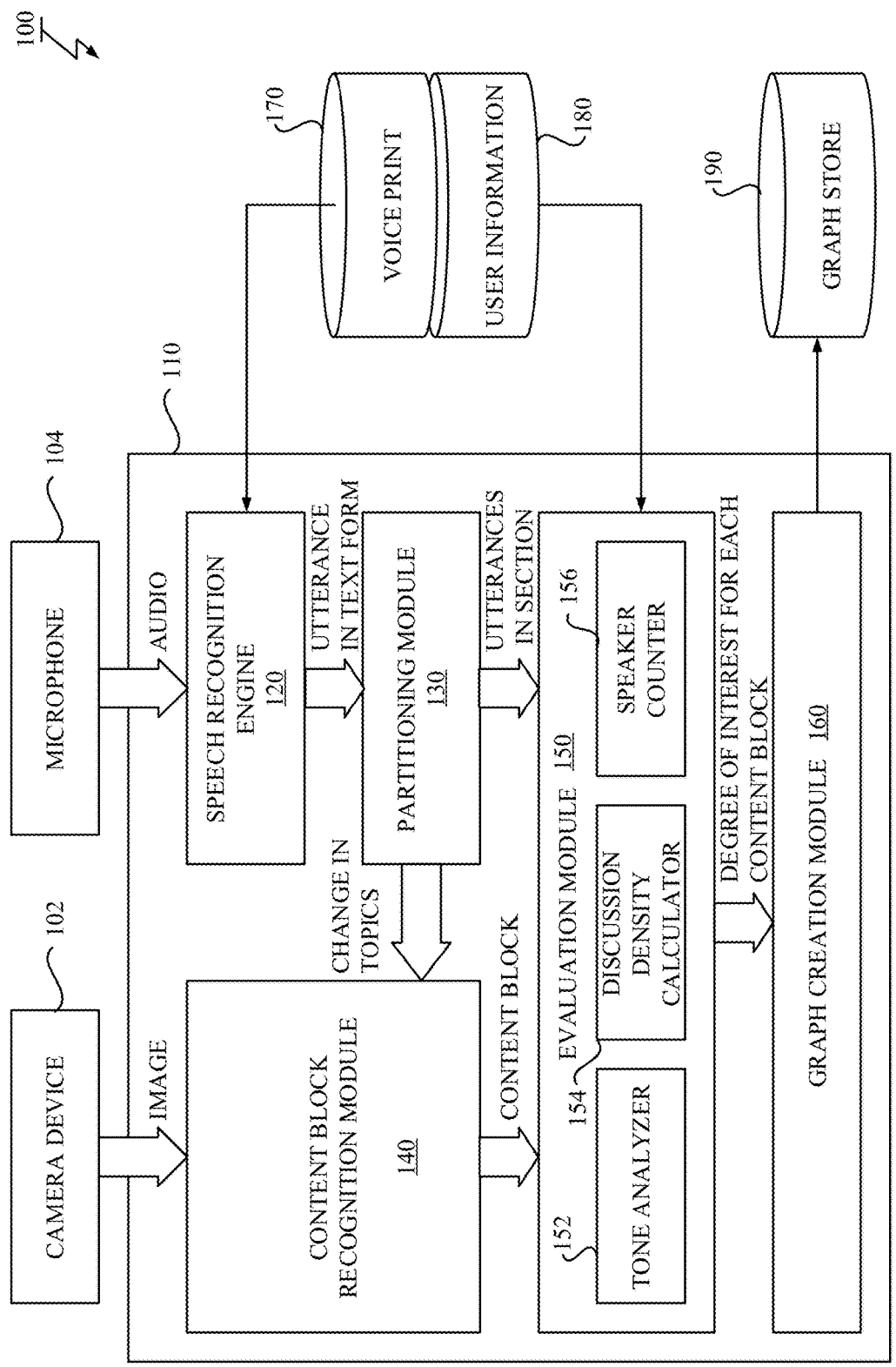
FIG. 2 illustrates a block diagram of the content recording and analysis system according to an exemplary embodiment of the present invention.

Referring to FIG. 2, a block diagram of the content recording and analysis system 100 is illustrated.

The computer system 110 may receive the video data that includes the image data transmitted from the camera device 102 and the audio data transmitted from the microphone 104. The computer system 110 may analyze the image data and the audio data in order to create a graphical representation of content written on the whiteboard B. In an exemplary embodiment, streaming data of the video data (the image data) is input to the computer system 110 continuously as content data that includes a series of images capturing the content being written on the whiteboard B.

In FIG. 2, a block diagram of the computer system 110 is depicted in more detail. As shown in FIG. 2, the computer system 110 may include a speech recognition engine 120 for converting the audio data in the video data into a text of utterances; a partitioning module 130 for partitioning the text of the utterances into one or more sections; a content block recognition module 140 for recognizing a block of content (that is referred to as a content block) for each section from the image data; an evaluation module 150 for evaluating degree of interest for each content block by using the text of the utterances in each section; and a graph creation module 160 for creating the graphical representation of the content written on the whiteboard B.

The speech recognition engine 120 is configured to obtain an utterance data that represents the series of the utterances by converting the audio data into the series of the utterances in textual form. The speech-to-text conversion from the audio data may be based on any known speech-to-text conversion or speech recognition techniques, including GMM-HHM (Gaussian Mixture Model/Hidden Markov Model) system, DNN-HMM (Deep Neural Network/Hidden Markov Model) system, etc. Since the image data and the audio data are recorded in a synchronized manner, i.e., each audio segment and each image frame in the video data are associated with each other; the series of the utterances conveyed in the audio data may also be associated with the series of the image frames. The resultant utterance data may be passed to the partitioning module 130.

In an embodiment, the speech recognition engine 120 may be further configured to identify a speaker of each utterance from a corresponding audio segment in the audio data. The speaker may be identified by any speaker recognition technology, which is a technique for identifying who is speaking, by using voice print data that may be registered in a voice print database 170. However, in other embodiment, difference of the speakers may be at least recognized by speaker diarization or segmentation technology, which is a technique for identifying merely when the same speaker is speaking.

The partitioning module 130 may receive the utterance data passed from the speech recognition engine 120. The partitioning module 130 is configured to extract respective sections from the utterance data in a manner based on changes in topics. A signal indicating an end time of a current section and a start time of a next section may be passed to the content block recognition module 140 each time a change in the topics is detected. Resultant texts of one or more utterances included in each section may be passed to the evaluation module 150.

The partitioning module 130 may be further configured to detect a change in topics by using a result of taxonomy classification and/or keyword detection applied to the utterance data. Alternatively, the change in the topics may be detected by using timing information manually specified by any participant P during the communications. For example, a certain participant (e.g., chairperson) may be guided to submit a signal indicating a change in topics by pressing a certain button. Alternatively, the change in topics may be detected by using a result of a string, character or symbol detection applied to the image data. For example, a specific symbol written on the board, such as a bullet (typographical symbol), (1), (2) . . . , may be detected as an indication of changing the topics.

The content block recognition module 140 may obtain the image data continuously inputted from the camera device 102 as the content data and the signal indicating a break location between successive sections from the partitioning module 130. The content block recognition module 140 is configured to recognize a content block for each section from the image data such that each content block includes one or more content parts being written during a corresponding section. Resultant content block data that includes coordinate data defining regions and an image of the content block may be passed to the evaluation module 150.

In a particular embodiment, the content block recognition module 140 may read preceding and subsequent images from the stream data of the image data and calculate difference between the preceding and subsequent images as an image segment. The detected image segment represents a particular content part where a text/drawing are made or deleted during an interval between the preceding and subsequent images. The content block recognition module 140 may further configured to merge the image segments overlapping or adjoining each other, if any. By aggregating the image segments in the same section, one or more larger content parts are finally formed. The interval between the preceding and subsequent images may be set to an appropriate value (e.g. per 1 frame, per 10 frames depending on a frame rate or still image shooting interval).

The evaluation module 150 may receive the texts of the one or more utterances included in each section and the content block data from the partitioning module 130 and the content block recognition module 140, respectively. The evaluation module 150 is configured to calculate evaluation value, which measures degree of interest of the participants, for each content block by using the one or more utterances included in each section. A set of the evaluation value and the content block data may be passed to the graph creation module 160.

In a particular embodiment, the evaluation module 150 may include a tone analyzer 152 for obtaining one or more tones of discussions for each section; a discussion density calculator 154 for calculating density of discussion (discussion density) for each section and a speaker counter 156 for counting the number of the speakers who have participated in the discussions for each section. The evaluation module 150 may be configured to calculate the evaluation value for each content block by using the one or more tones obtained by the tone analyzer 152, the discussion density calculated by the discussion density calculator 154 and/or the number of the speakers counted by the speaker counter 156. In calculating the evaluation value, scores for each item (the tones, the discussion density, the number of the speakers) can be normalized using a maximum value and a minimum value over the multiple content blocks.

The tone analyzer 152 is configured to obtain one or more tones for each section by using a result of linguistic analysis applied to the text of the one or more utterances in each section. The one or more tones obtained by the tone analyzer 152 may include emotional tones, each of which measures different types of emotions and/or feelings that participants express, including joy, fear, sadness, disgust, anger, etc. A ratio of the emotional tones to whole tones can be used as a score of the tones. The computer system 110 can execute the linguistic analysis or receive a result of the linguistic analysis from a cloud service through an appropriate API (Application Programming Interface).

The discussion density calculator 154 is configured to calculate the discussion density for each section in a manner based on the amount of the utterances included in each section and time length of each section. The amount of the utterances included in each section can be measured by word count or character count. The time length of each section can be measured by referring to timestamp of utterances. The amount of the utterances may be divided by the time length to derive a score of the discussion density.

The speaker counter 156 is configured to count the number of the speakers involved in discussions for each section. In an embodiment, each utterance is associated with a corresponding speaker from among one or more registered speakers, each of which may be associated with a social attribute (e.g. job title) in a user information database 180. In an embodiment, the number of the speakers who have participated in the discussion for each section may be calculated by taking the social attribute of the speaker into account. For example, the count may be weighted by 1.2 for a first job title and 1.0 for a second job title. The counted number of the speakers can be used as a score of the number of the discussion participants.

The graph creation module 160 is configured to create a graphical representation of the content written on the whiteboard B by using the content block data and the evaluation value for each content block. In the graphical representation, a difference in the evaluation value is represented by certain visual expression. Such visual expression would make a difference in appearance of the content parts included in each content block. In a particular embodiment, the graphical representation has a heatmap-like style, in which the difference in the evaluation values is represented by color difference such that a content block with a higher evaluation value is highlighted by a different color other than that of a content block with a lower evaluation value.

In an embodiment, the graph creation module 160 may define a region (e.g. box) encompassing the content parts associated with each section and recognize a content element from an image corresponding to the region by using any known character recognition and/or image tracing technologies. Note that each content element may be a character, a string, a graphic, a picture or any combination thereof, independently. The character and the string can be recognized by any known character recognition techniques. The graphic and the picture can be recognized by any known image tracing techniques. The graph creation module 160 may further create a graphical object (e.g. a text box, a sticky note) for each content block, in which the content elements (e.g. texts) are arranged. In a particular embodiment, the content elements in the graphical object may be configured to be editable. The obtained analysis result including the graph representation may be stored in a graph store 190.

In a particular embodiment, each of modules 120-160 and submodules 152-156 described in FIG. 1 may be implemented as a software module including program instructions and/or data structures in conjunction with hardware components such as a processor, a memory, etc.; a hardware module including electronic circuitry; or a combination thereof. These modules 120-160 and submodules 152-156 described in FIG. 1 may be implemented in a single computer system such as a personal computer, a server machine, or over a plurality of devices such as a computer cluster in a distributed manner. Also, the voice print database 170, the user information database 180 and the graph store 190 may be provided by using any internal or external storage device or medium, to which the computer system 110 can access.

Figure 3:
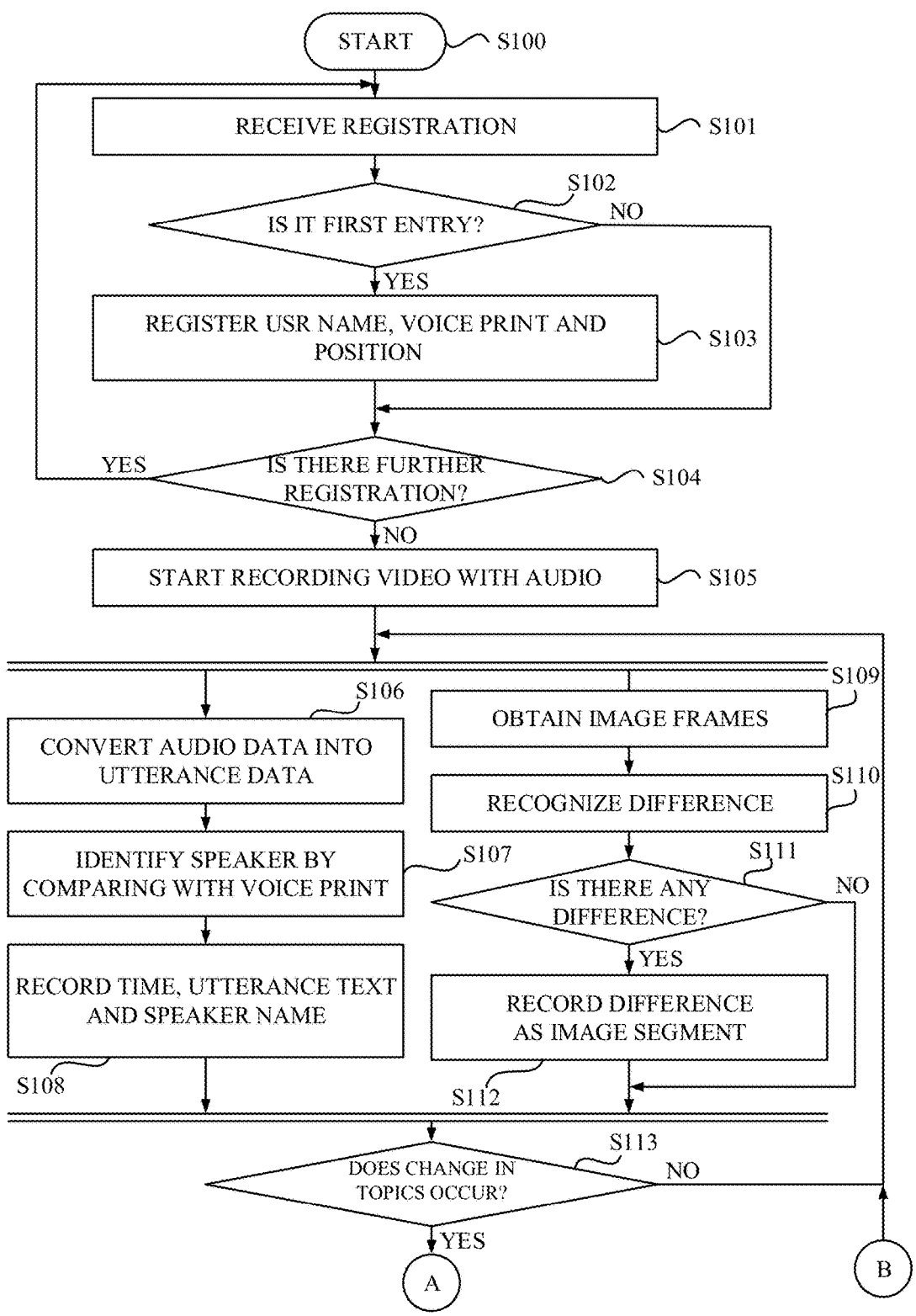
FIG. 3 is a first half of a flowchart depicting a process for analyzing content being written on a whiteboard according to an exemplary embodiment of the present invention.
Figure 4:
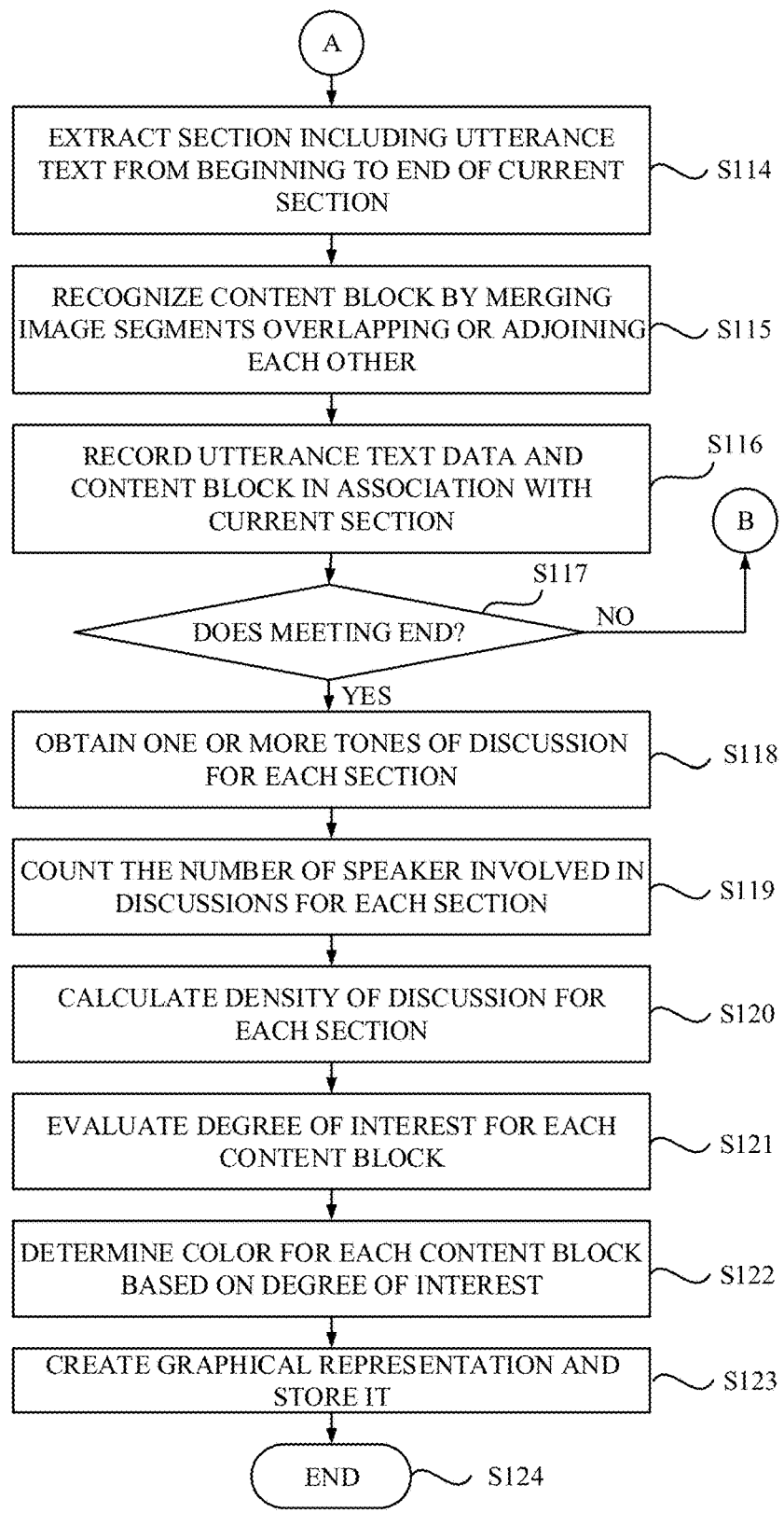
FIG. 4 is a latter half of the flowchart depicting the process for analyzing the content being written on the whiteboard according to an exemplary embodiment of the present invention.

Referring to FIG. 3 and FIG. 4, a process for analyzing content being written on a whiteboard is described in more detail. Note that the process shown in FIG. 3 and FIG. 4 may be executed by the computer system 110, i.e., a processing unit that implements the modules 120-160 shown in FIG. 2. In the following descriptions, let us assume a situation similar to that shown in FIG. 1, in which one or more participants P1-P6 attend a meeting and have a discussion on one or more topics while writing a text and/or drawing on a whiteboard B.

The process shown in FIG. 3 and FIG. 4 may begin at step S100 in response to receiving a request for starting a recording and analysis of content, from one of the participants P1-P6. At step S101, the computer system 110 may receive a request of registration from one participant who wants to participate in the meeting. The request of the registration may include a user name assigned to the participant, a voice spoken by the participant, and a social attribute (e.g. job title) associated with the participant. The participant can enter his/her user name through an appropriate user interface such as keyboard or ID scanner. The participant may be guided to say something into the microphone 104 for enrolment, and the voice of the participant can be obtained through the microphone 104. The participant can also enter his/her social attribute through an appropriate user interface. Alternatively, the social attribute can be obtained from an external human resource database by using the user name as a key. At step S102, the computer system 110 may determine whether it is first entry or not. When the computer system 110 determines that it is first entry in step S102 (YES), control may transfer to step S103.

At step S103, the computer system 110 may register the user name, a voice print and, the social attribute of the participant. The user name and the social attribute of the participant may be included in the request of the registration and the voice print may be formed from a plurality of features extracted from the participant's voice. When the computer system 110 determines that the registration is not first time in step S102 (NO), control may transfer to step S104 directly. If there is already an entry having an identical user name in the database 170, a negative determination result would be obtained.

At step S104, a determination is made as to whether there is any further registration request or not. When the computer system 110 determines that there is a further registration request to be processed in step S104 (YES), control may loop back to step S101. On the other hand, when the computer system 110 determines that there is no further registration request in step S104 (NO), control may transfer to step S105. In accordance with the situation shown in FIG. 1, control would transfer to step S105 after registrations of all the participants P1-P6 are finished.

At step S105, the computer system 110 may start recording video data by instructing the camera device 102 to start acquisition of the image data. After starting the recording of the video data, first section may be initiated, and the image data and the audio data in the video data may be processed in parallel.

At step S106, the computer system 110 may convert the audio data into one or more utterances in textual form by using the speech-to-text conversion so as to obtain the utterance data. As described above, the series of the utterances may be associated with the series of the images in the video data. Each audio segment, which can be detected by a voice activity detector for example, may be processed in sequence. At step S107, the computer system 110 may identify a speaker for each utterance from a corresponding audio segment by comparing with the voice prints in the voice print database 170. At step S108, the computer system 110 may record a timestamp, the text of each utterance obtained at step S106 and a user name of the speaker identified at step S107, and the process may proceed to step S113.

In parallel with the processing of the audio data, at step S109, the computer system 110 may obtain image frames from the image data in the video data. At step S110, the computer system 110 may recognize a difference between the preceding and subsequent image frames as an image segment. At step S111, the computer system 110 may determine whether there is any difference between the image frames or not. When the computer system 110 determines that there is some difference in step S111 (YES), control may transfer to step S112. At step S112, the computer system 110 may record the difference at which change is detected, as an image segment, and then the process may proceed to step S113. On the other hand, when the computer system 110 determines that there is no difference (including a case where there is a negligible difference) between the image frames in step S111 (NO), the process may proceed to step S113 directly.

Figure 5:
FIG. 5 describes a way of recognizing content parts according to an exemplary embodiment of the present invention.

Referring to FIG. 5, a way of recognizing content parts is illustrated. A series of images is read from the image data in sequence. Then, a difference between preceding and subsequent images, which may be indicated by a dashed circle 200*a*-200*f* in FIG. 5, can be obtained as an image segment for each pair of preceding and subsequent images, as illustrated in FIG. 5. The image segment may be formed so as to encompass written strokes with space around the strokes. The image of each image segment and coordinate data defining a region of each image segment may be saved at step S112.

Referring back to FIG. 3, at step S113, the computer system 110 may determine whether a change in topics has occurred or not. The change in the topics may be identified by using a result of the taxonomy classification applied to the utterance data. In a particular embodiment, changing of a class labeled to the utterance data may indicate the change in the topics. Alternatively, or additionally, the change in the topics may also be identified by using a result of keyword detection applied to the utterance data. In a particular embodiment, occurrence of particular key words (including key phrases, key sentences) such as "Let's move on to the next topic.", "With regard to the next topic, . . . ", etc. may indicate a presence of a change in the topics. The keyword detection can be achieved by a simple keyword search, or more sophisticated text classification technique. Alternatively, or additionally, the change in the topics may also be identified by timing information manually specified during the meeting. For example, the participants may be guided to submit a signal indicating a change in topics by pressing a certain button.

When the computer system 110 determines that no change is detected in step S113, control may transfer to step S106 and S109 for further processing of the audio data and image data. When the computer system 110 determines that the change in the topics is detected, the control may transfer to step S114 shown in FIG. 4 through a point A.

At step S114, the computer system 110 may extract a section from the utterance data, which may include the text of the utterances from beginning to end of the current section. At step S115, the computer system 110 may recognize a content block for the current section from the image data by merging image segments that overlaps or adjoins each other. In the step S115, the content block may be recognized such that the content block includes one or more content parts (210*a*, 210*b*) being written during the section, as shown in FIG. 5.

Referring back to FIG. 4, at step S116, the computer system 110 may record the text of the utterances obtained at step S114 and the content block data obtained at step S115 in association with the current section.

Figures 6A, 6B:
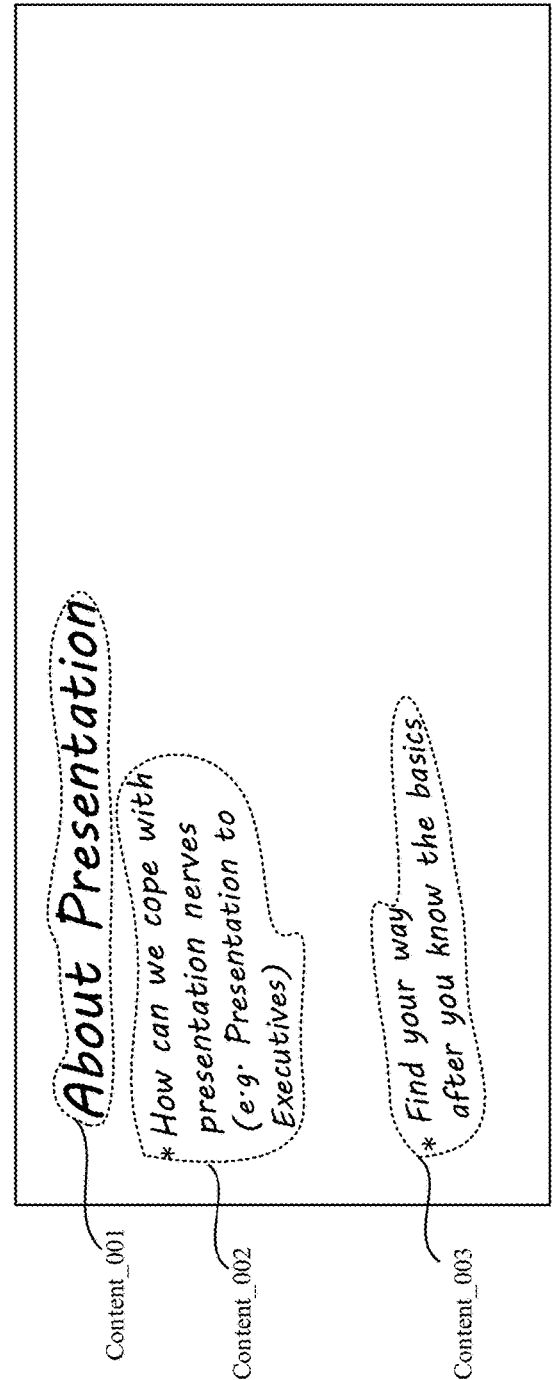
FIG. 6A shows an example of an utterance text table managed by the computer system according to an exemplary embodiment of the present invention.
FIG. 6B shows an example of a set of content blocks recognized by the computer system according to an exemplary embodiment of the present invention.

Referring to FIG. 6A, an example of an utterance text table managed by the computer system 110 is shown. As shown in FIG. 6A, the utterance text table includes a timestamp field; an utterance text field; a speaker filed; and a content field. The timestamp field, the utterance text field and the speaker filed in each record of the utterance may be set at step 108 each time new utterance is detected. As indicated by thick lines in FIG. 6A, a group of records may be extracted as a section at step S114 each time the change in the topics is detected. A pointer or file name of the content block data may be set to the content field associated with the group of the records of the section. In this example shown in FIG. 6A, since the change in the topics occurs at 10:05 and 10:10, the text of the utterances during the period of 10:05 to 10:07 may be associated with one section.

Referring to FIG. 6B, an example of a set of content blocks recognized during the process is shown. As shown in FIG. 6B, three content blocks (Content_001, Content_002, Content_003) are recognized on the surface of the whiteboard B and associated with corresponding groups of utterances in the utterance text table shown in FIG. 6A. The content block data that is pointed by the pointer or indicated by file name in the content field may include coordinate data defining regions and an image of the content block as indicated by a dashed circle in FIG. 6B.

Referring back to FIG. 4, at step S117, the computer system 110 may determine whether the meeting has ended or not. When the computer system 110 determines that the meeting has not ended yet in step S117 (NO), control may transfer to step S106 and S109 through a point B for further processing of the audio data and image data for next section.

When the computer system 110 determines that the meeting has ended in step S117 (YES), control may transfer to step S118. The end of the meeting may be detected in a similar manner as mentioned above in relation to the break location between successive sections.

At step S118, the computer system 110 may obtain one or more tones of discussion for each section by using a result of linguistic analysis applied to the text of the utterances included in the section.

As described above one or more tones in the result of the linguistic analysis may include emotional tones, each of which measures different types of emotions and/or feelings that participants express. By the linguistic analysis, other type of tones such as social tone and language tone may also be obtained. Note that the social tone measures social tendencies in writing/speaking, whereas the language tone describes writing/speaking style. In this particular embodiment, a ratio of the emotional tones to whole tones can be used as the score of the tones. The score of the tones may be normalized using the values of all the sections.

For example, let us assume that the meeting includes three sections, each of which has the following characteristics:
Section 1: ratio of emotional tone=10%,
Section 2: ratio of emotional tone=50%,
Section 3: ratio of emotional tone=80%.

In this example, the scores of the tones for the respective sections, $ST_i$ (i=1, 2, 3), would be:
Section 1: $ST_1=0$,
Section 2: $ST_2=(50-10)/(80-10)=0.57$,
Section 3: $ST_3=1$.

At step S119, the computer system 110 may count the number of the speakers involved in the discussion for each section. The social attribute of each speaker can also be taken into account. In the step S119, the speakers who have uttered even one single word are counted. As similar to the score of the tones, the value normalized (0 to 1) using the number of the speakers of all the sections can be used as a score of the number of the discussion participant.

For example, let us assume that three sections have following characteristics:
Section 1: the number of the speakers=2,
Section 2: the number of the speakers=5,
Section 3: the number of the speakers=8.

In this example, the scores of the number of the discussion participants for the respective sections, $SN_i$ (i=1, 2, 3), would be:
Section 1: $SN_1=0$,
Section 2: $SN_2=(5-2)/(8-2)=0.5$,
Section 3: $SN_3=1$.

In this example, the social attribute of each speaker is not taken into account. However, in other embodiment, the social attribute of each speaker can be taken into account when counting the number of the speakers.

At step S120, the computer system 110 may calculate the discussion density for each section based on the amount of the utterances included in each section and time length of each section. Amounts of utterances made in a predetermined period of time (words per unit of time) can be calculated as the score of the discussion density, instead of using a time length of the section or amounts of the utterances in the section itself simply. The time length of the section may be calculated from start time and end time of each section. The amounts of utterances may be measured by word count or character count. The score of the discussion density may be calculated by using following equation:

$$\text{discussion density} = \text{time length} / \text{amount of utterances}$$

As similar to the score of the tones and the number of the discussion participants, the calculated value of the discussion density can be normalized (0 to 1) using the values of all the sections.

For example, let us assume that three sections have following characteristics:
Section 1: time length is 20 minutes and amount of utterances=4000 words,
Section 2: time length is 10 minutes, and amount of utterances=3500 words,
Section 3: time length is 30 minutes, and amount of utterances=9000 words.

In this example, the score of the discussion density for the respective sections, $SD_i$ (i=1, 2, 3), would be
Section 1: $SD_1=(200-200)/(350-200)=0$,
Section 2: $SD_2=(350-200)/(350-200)=1$,
Section 3: $SD_3=(300-200)/(350-200)=0.67$.

In this example, the social attribute of each speaker is not taken into account. However, in other embodiment, the social attribute of each speaker can be taken into account when calculating the discussion density. For example, when a participant with a particular job title says something that consists of 10 characters or words, then it's counted as 12 characters or words.

At step S121, the computer system 110 may calculate the evaluation value indicating degree of interest of the participants for each content block by using the scores of the tones $ST_i$, the discussion density $SD_i$ and the number of the discussion participants $SN_i$, each of which may be obtained from the utterances included in each section.

The evaluation value for each content block $EV_i$ can be calculated by following equation:

$$EV_i = ST_i + SN_i + SD_i.$$

After performing extraction of a section (step S114), recognition of a content block (S115) and calculation of evaluation value (S121) repeatedly for each section, the computer system 110 can obtain a plurality of sets of the evaluation value and the content block for all the sections. In accordance with the previous illustrative examples, the evaluation values of respective sections, $EV_i$ (i=1, 2, 3), would be calculated as follows:
Section 1: $EV_1=0$,
Section 2: $EV_2=0.57+0.5+1=2.07$,
Section 3: $EV_3=1+1+0.67=2.67$.

At step S122, the computer system 110 may determines color to be assigned to each content block based on the evaluation values. In step S122, different colors are assigned to the content blocks in accordance with the resultant evaluation values. For example, warm colors may be allocated to content blocks having higher values while cold colors may be assigned to those having lower values. At step S123, the computer system 110 may create the graphical representation and store it as a document file in the graph store 190, and the process may end at step S124.

Figure 7:
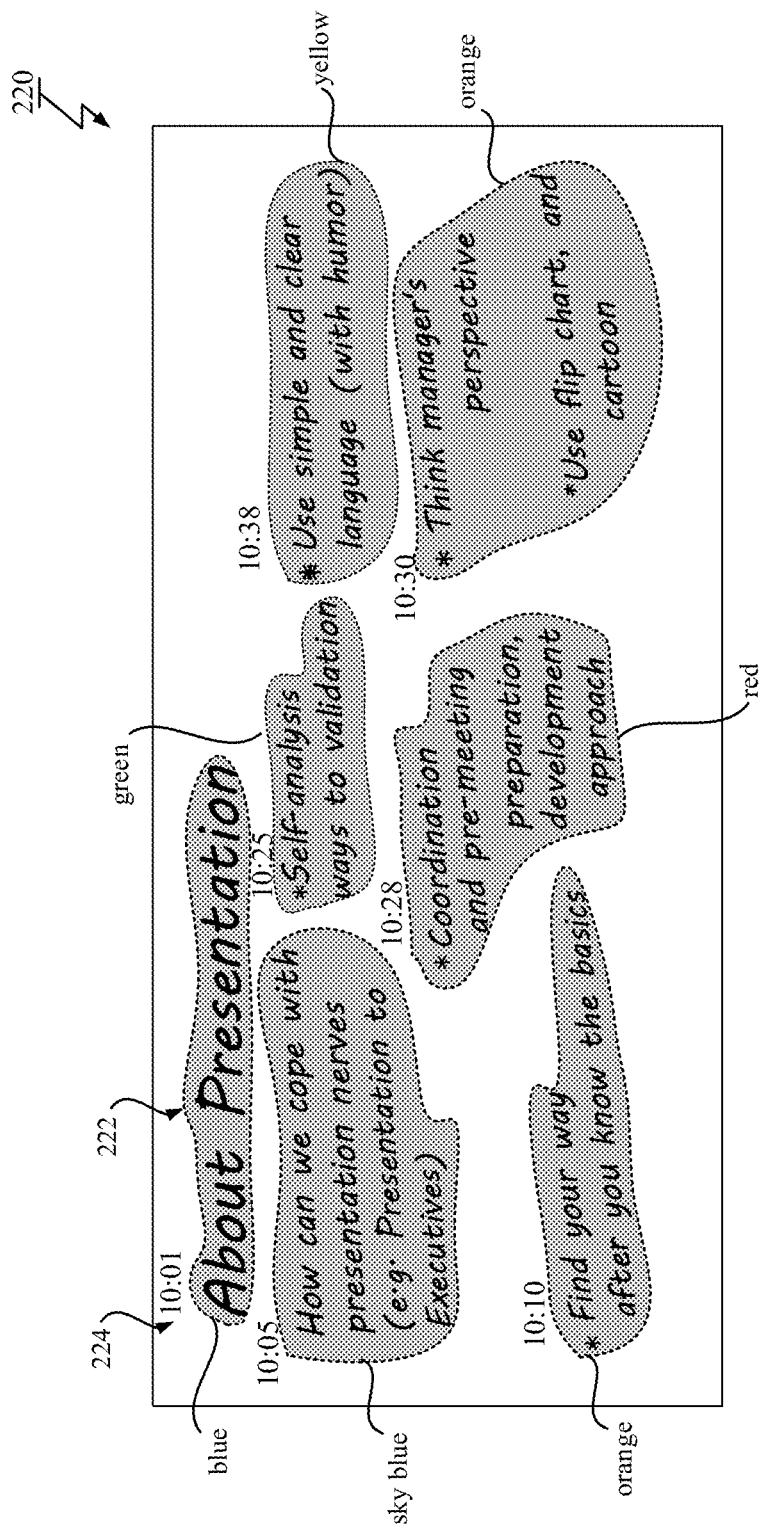
FIG. 7 illustrates an example of a graphical representation created by the computer system according to an exemplary embodiment of the present invention.

Referring to FIG. 7, an example of a heatmap-like graphical representation 220 created by the computer system 110 is illustrated. The graphical representation 220 shown in FIG. 7 includes a plurality of highlighted regions 222 (merely one is attached a numeric in FIG. 7, representatively), each of which overlays on a corresponding content block translucently and has a color assigned thereto. As shown in FIG. 7, blue, sky blue, green, yellow, orange and red are assigned to corresponding content blocks in accordance with order of the evaluation values. The red may be assigned to a content block having maximum value and the blue to that of the minimum value. Same color may be assigned to plural content blocks, if the number of the content blocks is greater than the number of predetermined colors. In the graphical representation 220, a difference in the evaluation values is represented by color difference, which makes a difference in appearance of the content parts included in each content block. Also in the graphical representation 220 shown in FIG. 7, an indication 224 (merely one is attached a numeric in FIG. 7, representatively) of start time of the section is arranged nearby the highlighted region 222 of the corresponding content block.

Figure 8:
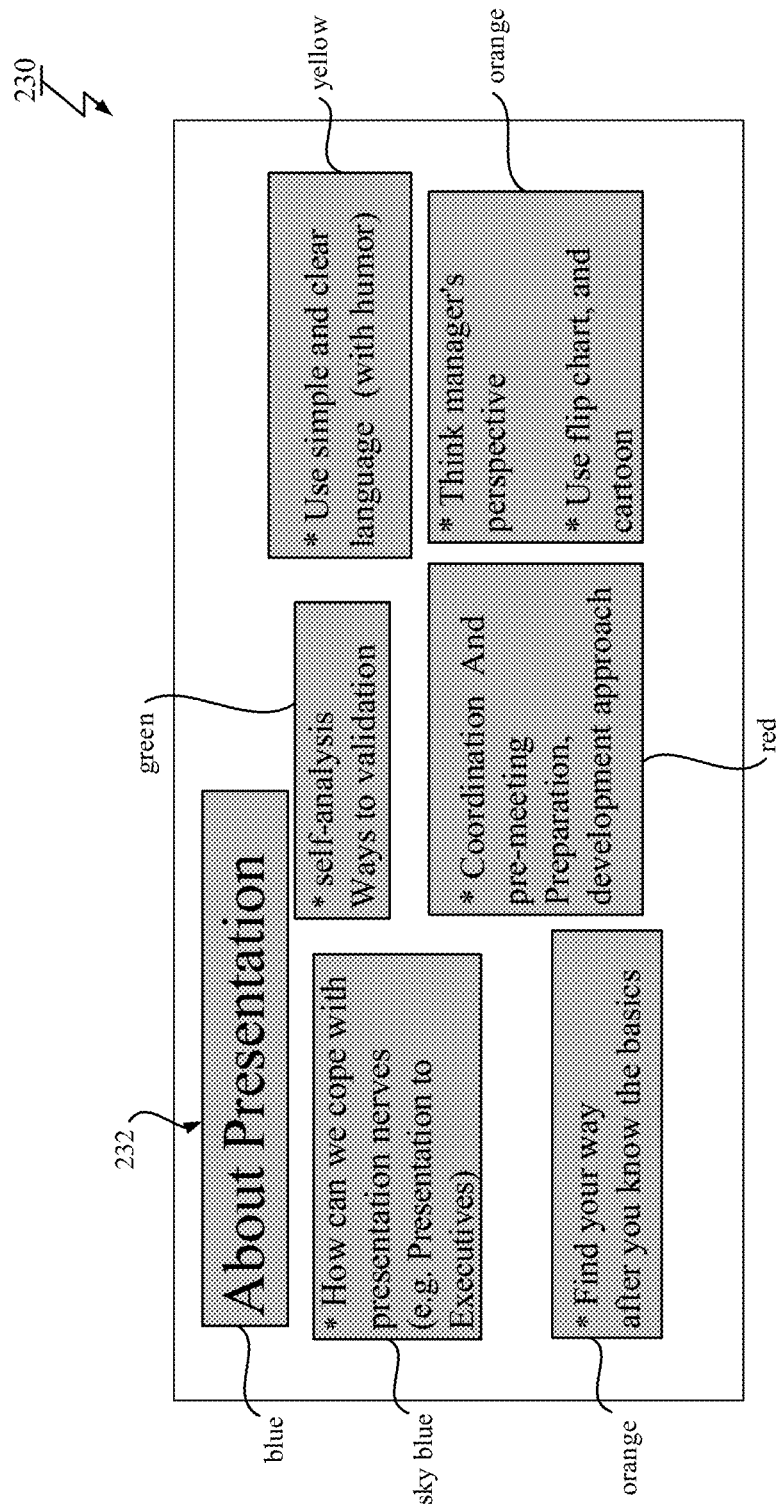
FIG. 8 illustrates an example of a formatted graphical representation created by the computer system according to an exemplary embodiment of the present invention.

Referring to FIG. 8, a formatted graphical representation 230 created by the computer system is illustrated. In the graphical representation 220 shown in FIG. 7, each highlighted region 222 just overlays on the corresponding content block, translucently. The content block may include handwriting text as it is. However, in the formatted graphical representation 230 shown in FIG. 8, each content block is replaced by a graphical object 232 such as a text box or sticky note, in which one or more content elements such as a text are arranged alternative to handwriting. The content elements arranged in the graphical object 232 may be recognized from an image of a region of the original content block. The content elements arranged in the graphical object 232 may be configured to be editable in the document file. In a particular embodiment, the graphical representation 230 may be configured to pop up tooltip showing supplemental information such as user names of participants who have participated in the respective discussions when a mouse pointer is hovered over the graphical object 232 in the graphical representation 230. If there is content that have been deleted, the deleted content parts may also be displayed over the other content part.

In a particular embodiment, the graphical representation created by the computer system 110 can be saved as a file in an appropriate format for productivity software for producing documents, presentations, spreadsheets, charts, graphs, etc. When aforementioned functionalities of the computer system 110 are implemented as a client or desktop application, the file can be open by using appropriate application to display the graphical representation 220, 230 on a display device of the computer system 110. On the other hand, when aforementioned functionalities of the computer system 110 are implemented as a server application, a file or data (such as a HTML (Hypertext Markup Language)) of the graphical representation 220, 230 may be transmitted to a client computer such that the graphical representation 220, 230 is displayed on a display device of the client computer.

According to the aforementioned embodiment, there can be provided a novel technique for analyzing content written on a board by using data of utterances regarding the content to provide graphical representation of the content, in which the content written on the board is partitioned into a several content blocks with indications of its degree of interest, thereby allowing for identifying a particular part about which discussions have been made actively.

In the aforementioned exemplary embodiment, it has been described that the video data is inputted as the streaming data from the camera device 102 and the microphone 104, respectively. However, in other embodiment, the video data may be given as a file stored on a storage device or medium. In this alternative embodiment, the analysis can be performed after the end of the meeting, at which a whole of video data has been prepared.

Also in aforementioned exemplary embodiment, it has been described that a board on which the participant can write is a kind of physical real-world thing such as the whiteboard, blackboard, etc., and the communications such as meeting is held in oral form. However, in other embodiment, a virtual whiteboard that may be implemented in an online meeting application can also be employed as a board on which the participants write texts and/or drawings, and communications may be performed through a network among participants by using a voice transmitting system or a text messaging system. Hence, the term "utterances" may include not only talks spoken actually by the participant but also talks issued by the participant in textual form.

Furthermore in the aforementioned exemplary embodiment, it has been described that the series of the images is taken by the camera device as a bitmap image format: however, in other embodiment where the interactive whiteboard or the virtual whiteboard is employed, the series of the images may be obtained as a collection of pen stroke data, in which coordinates of trajectory, pen pressure and timestamps of pen down and/or pen up events are recorded as a vector image like format.

Computer Hardware Component

Figure 9:
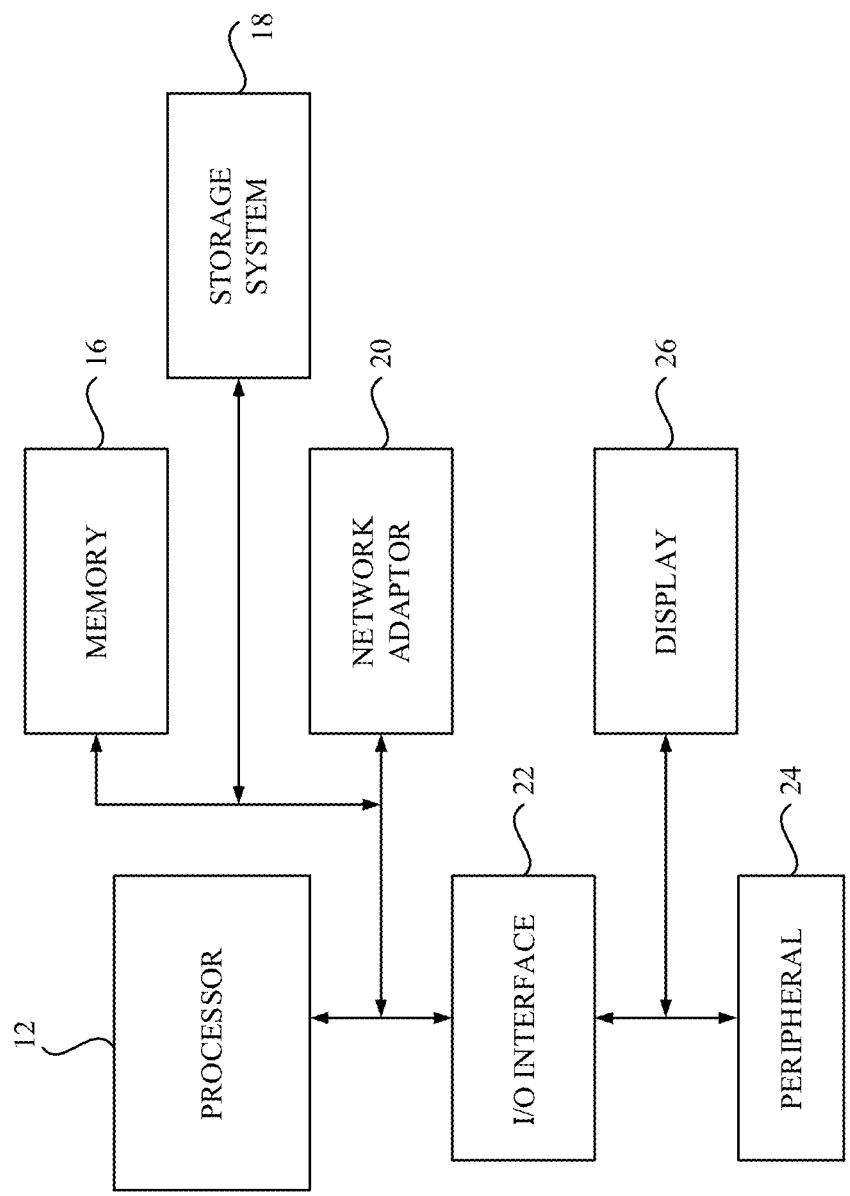
FIG. 9 depicts a computer system according to one or more embodiments of the present invention.

Referring now to FIG. 9, a schematic of an example of a general computer system 10, which can be used for the computer system 110 in the content recording and analysis system 100, is shown. The computer system 10 shown in FIG. 9 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for analyzing content written on a board, the method comprising:
    obtaining content data including a series of images, wherein the series of the images captures content written on the board;
    obtaining utterance data representing a series of utterances, wherein the series of the utterances is associated with the series of the images;
    extracting a section from the series of the utterances based on a change in topics;
    recognizing a content block for the section from the content data, wherein the content block includes one or more content parts written during the section;
    calculating an evaluation value for the content block by using one or more utterances included in the section;
    creating a graphical representation where a difference in the evaluation value is represented by a visual expression, wherein the visual expression makes a difference in an appearance of the one or more content parts included in each content block; and
    displaying the graphical representation on a display device.

2. The method of claim 1, wherein the method further comprises:
    performing the extracting, the recognizing, and the calculating two or more times for each section so as to obtain a plurality of sets of the evaluation value and the content block.

3. The method of claim 1, wherein the calculating comprises:
    calculating a density of discussion for the section based on an amount of the one or more utterances included in the section and a time length of the section, wherein the density of the discussion is used for calculating the evaluation value.

4. The method of claim 1, wherein the calculating comprises:
    obtaining one or more tones for the section by using a result of a linguistic analysis applied to the one or more utterances included in the section, wherein the one or more tones are used for calculating the evaluation value.

5. The method of claim 1, wherein the one or more utterances are associated with respective speakers, wherein the calculating comprises:
    counting a number of the respective speakers involved in one or more communications in the section, wherein the number of the respective speakers is used for calculating the evaluation value.

6. The method of claim 5, wherein each speaker of the respective speakers is associated with a social attribute and the evaluation value is calculated by using the social attribute of the speaker for each of the one or more utterances in the section.

7. The method of claim 5, wherein the utterance data is converted from audio data associated with the content data, the method further comprising:
identifying a speaker for each of the one or more utterances from a corresponding audio segment in the audio data by using given voice print data for one or more registered speakers.

8. The method of claim 1, wherein the method further comprises:
detecting the change in the topics, wherein the change is identified by using a result of a taxonomy classification applied to the utterance data.

9. The method of claim 1, wherein the content data is a video data having audio data associated therewith, wherein the video data is generated by capturing the board on which a text is made and the one or more utterances is spoken by one or more speakers, the obtaining of the utterance data further comprising:
converting from the audio data to the utterance data in textual form by using speech-to-text conversion.

10. The method of claim 9, wherein the method further comprises:
reading a preceding image and a subsequent image from the video data;
calculating a difference between the preceding and the subsequent images as an image segment; and
merging a first image segment with a second image segment, associated with same section, to obtain the one or more content parts for the section,
wherein the first image segment, at least partially, overlaps the second image segment.

11. The method of claim 1, wherein the method further comprises:
defining a region encompassing the one or more content parts associated with the section;
recognizing one or more content elements based on an image corresponding to the region, wherein each content element is selected from the group consisting of a character, a string, a graphic, and a picture;
creating, for the section, a graphical object having the one or more content elements arranged therein, wherein the one or more content elements of the graphical object is configured to be editable; and
storing an analysis result including the graphical object.

12. The method of claim 1,
wherein the board is selected from the group consisting of a whiteboard, a blackboard, an interactive whiteboard, a tablet computer having a whiteboard application installed thereon,
wherein the one or more utterances is selected from the group consisting of a statement, a remark, a question, a declaration, a proposal, a response made in a communication of one or more speakers in oral form, through a voice transmitting system, and a response made in a communication of one or more speakers in oral form through a text messaging system.

13. A computer system for analyzing content written on a board, the computer system comprising:
a memory tangibly storing program instructions; and
a processing circuit in communication with the memory, wherein the processing circuit is configured, by executing the program instructions, to:
obtain content data including a series of images, wherein the series of the images captures content written on the board;
obtain utterance data representing a series of utterances, wherein the series of the utterances is associated with the series of the images;
extract a section from the series of the utterances based on a change in topics;
recognize a content block for the section from the content data, wherein the content block includes one or more content parts written during the section
calculate an evaluation value for the content block by using one or more utterances included in the section;
create a graphical representation where a difference in the evaluation value is represented by a visual expression, wherein the visual expression makes a difference in an appearance of the one or more content parts included in each content block; and
display the graphical representation on a display device.

14. The computer system of claim 13, wherein the processing circuit is further configured to:
extract one or more subsequent sections based on each change in the topics;
recognize one or more subsequent content blocks for the one or more subsequent sections; and
calculate an evaluation value for each subsequent content block;
wherein the difference in an appearance of the one or more content parts included in the content block is in comparison to the one or more subsequent content blocks.

15. The computer system of claim 13, wherein the processing circuit is further configured to:
calculate a density of discussion for the section based on an amount of the one or more utterances included in the section and time length of the section, wherein the density of the discussion is used for calculating the evaluation value.

16. The computer system of claim 13, wherein the processing circuit is further configured to:
obtain one or more tones for the section by using a result of a linguistic analysis applied to the one or more utterances included in the section, wherein the one or more tones are used for calculating the evaluation value.

17. The computer system of claim 13, wherein the one or more utterances are associated with respective speakers, the processing circuit being further configured to:
count a number of the respective speakers involved in one or more communications in the section, wherein the number of the respective speakers is used for calculating the evaluation value.

18. A computer program product for analyzing content written on a board, the computer program product comprising a computer readable storage medium having program instructions embodied therewith, the program instructions executable by a processor for performing a method comprising:
obtaining content data including a series of images, wherein the series of the images captures content written on the board;
obtaining utterance data representing a series of utterances, wherein the series of the utterances is associated with the series of the images;
extracting a section from the series of the utterances based on a change in topics;
recognizing a content block for the section from the content data, wherein the content block includes one or more content parts written during the section; and calculating an evaluation value for the content block by using one or more utterances included in the section;

creating a graphical representation where a difference in the evaluation value is represented by a visual expression, wherein the visual expression makes a difference in an appearance of the one or more content parts included in each content block; and displaying the graphical representation on a display device.

19. The computer program product of claim 18, wherein the method further comprises:

performing the extracting, the recognizing, and the calculating two or more times for each change in the topics so as to obtain a plurality of sets of the evaluation value and the content block; and.

20. The computer program product of claim 18, wherein the calculating comprises:

calculating a density of discussion for the section, wherein the density of the discussion is used for calculating the evaluation value.

* * * * *